(No Model.)
J. R. BRANDEN.
VALVE.
No. 508,464.  Patented Nov. 14, 1893.
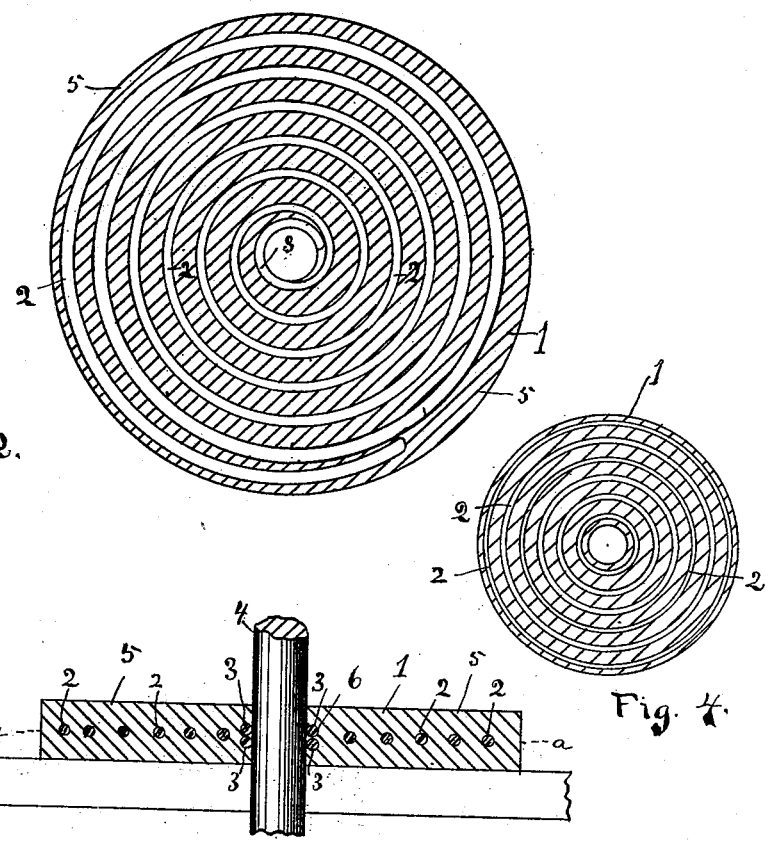
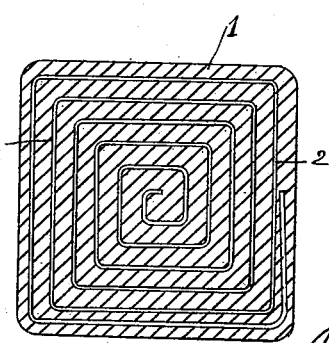
Fig. 2.
Fig. 4.
Fig. 1.
Fig. 3.
Attest:
Charles Shewey
A. J. H. Ebbesen
Inventor:
Jeffries R. Branden
by
Mashmun Butnur
attys
THE NATIONAL LITHOGRAPHING COMPANY,
WASHINGTON, D. C.

UNITED STATES PATENT OFFICE.

JEFFRIES R. BRANDEN, OF CHICAGO, ILLINOIS.

VALVE.

SPECIFICATION forming part of Letters Patent No. 508,464, dated November 14, 1893.

Application filed November 29, 1892. Serial No. 453,489. (No model.)

*To all whom it may concern:*

Be it known that I, JEFFRIES R. BRANDEN, a citizen of the United States of America, residing at Chicago, in the county of Cook and State of Illinois, have invented certain new and useful Improvements in Valves, of which the following is a specification.

My invention pertains especially to improvements in valves composed of rubber or a similar substance which produces a valve having a pliable seating surface, and the object of the invention is to produce a valve which, while being provided with a great strength for sustaining a heavy load over the parts of its seat, will be sufficiently pliable to seat properly upon a face having a slightly roughened and uneven surface, and at the same time have sufficient flexibility to retain its original form and contour after being bent and contorted by the action of a heavy pressure over gravel or other impediments which are liable to be caught between the valve and its seat.

In the drawings my invention will be found illustrated with the figures of reference used in the following description designating the same parts throughout the several views.

Figure 1, represents a transverse section of a valve containing my improvement. Fig. 2, is a horizontal section of the same taken at a—a with the disk in a circular form. Fig. 3, is the same arranged in a rectangular form, for a hinged valve. Fig. 4 is a horizontal section showing a modification.

1, represents a disk composed of a series of helical coils 2, of wire, the several outer single coils having an annular space between, while the inner coils 3, are double and arranged to encircle and neatly fit the guide rod or pin, 4, over which the coils are passed and upon which the valve is to operate the double coils 3, forming a hub, which projects above and below the coils 2, and provides a wearing surface for the guide pin, 4, which retains the valve in its proper position.

The disk 1, is covered above and below, and also between and outside of the coils with a rubber coating or composition 5, which is pressed into the well known form of an ordinary valve of this character, the rubber composition being of the same thickness and dimension of the ordinary rubber valve while the wire coils located substantially midway between its lateral faces, so that rubber surfaces only are presented to the valve seat.

It will be seen that when the valve covers the parts of an ordinary valve seat in the usual way the coils 3, extend over the ports and sustain portions of the rubber disk above from crushing into the ports when subjected to a heavy load, and at the same time the several coils are possessed of sufficient elasticity or pliability to allow the valve to seat itself perfectly over the ports, or to allow one side of the valve to rise over any small obstruction such as gravel or sticks which are liable to be caught between the valve and its seat when used for pumping water, and to again recover its original form and contour when the obstruction is removed.

The advantage of this improvement is very great as the ordinary disk valve of rubber when subjected to a heavy strain and constant use is available only for a limited period of time, as the constant pounding of the valve upon its seat causes the valve to bulge into the port openings, and this action causes the valve to become cracked or broken over the edges of the port openings so as to render the valve practically useless after a very short period of wear and service, while by reinforcing the valve by the series of coils of wire, a support for the valve over the ports is provided for, sustaining the pliable material against crushing into the port openings so that the openings may be of considerably increased area so that the strain of the power required to lift the valve is greatly lessened, and the valve face is retained in its original contour and surface for a greatly increased period of time, and at the same time its efficiency is increased by being at all times in perfect condition for closing upon its seat with a perfect and close joint.

Another great advantage is that while provided with a metallic reinforce, which imparts a degree of rigidity to its structure which serves to retain the valve in its original form and contour, a proper flexibility is provided which allows the valve to close over any piece of gravel or other small obstruction without breaking the valve or losing its original contour when the obstruction is removed, and I wish to call attention particularly to this feature, as when the valve is used in pumping small pieces of coal, gravel and clumps of wood are liable to become jammed into the ports or to be drawn through and caught upon the seat above the ports, and in that case were the reinforce entirely rigid or in the form of a metal plate, a bend in the valve would occur, and the valve in that case is rendered useless on account of the impossibility of straightening the plate to bring the valve to its original form.

Of course, it will be understood that while I have a preferred form of construction consisting of a spiral wire, this form is not altogether necessary or required, as a series of wire rings with an increasing diameter having a proper annular space between and inclosed in the rubber covering in the same manner as before stated will produce the same result, and also be in every way available for the construction of the valve, and the same is true of the form of the coils, and as shown in Fig. 3, a rectangular series of wire coils is arranged which provides a valve particularly adapted for a hinged or flap form of valve, so that I wish it understood that—

What I wish to claim, broadly, as my invention is—

A rubber disk valve having a central opening for the guide pin and provided with a metal wire reinforce composed of the double inner coils or rings around said opening, and the series of outer coils or rings extending centrally between the sides throughout the structure of the disk; substantially as set forth.

JEFFRIES R. BRANDEN.

Witnesses:
 CHARLES O. SHEWEY,
 A. I. H. EBBESEN.